(12) United States Patent
Beyer et al.

(10) Patent No.: US 6,889,496 B2
(45) Date of Patent: May 10, 2005

(54) COMBUSTION CHAMBER STRUCTURE AND ITS MANUFACTURING PROCESS

(75) Inventors: Steffen Beyer, Munich (DE); Peter Bichler, Entraching (DE); Wolfgang Keinath, Hoehenkirchen-Siegertsbrunn (DE); Roland Kindermann, Haar (DE); Dieter Kunzmann, Taufkirchen (DE)

(73) Assignee: EADS Space Transportation GmbH, Munich (DE)

( * ) Notice: Subject to any disclaimer, the term of this patent is extended or adjusted under 35 U.S.C. 154(b) by 23 days.

(21) Appl. No.: 10/638,559

(22) Filed: Aug. 12, 2003

(65) Prior Publication Data
US 2004/0148924 A1 Aug. 5, 2004

(30) Foreign Application Priority Data
Aug. 12, 2002 (DE) .......................................... 102 37 381

(51) Int. Cl.⁷ ............................................... F02K 9/40
(52) U.S. Cl. ..................... 60/267; 29/890.01
(58) Field of Search ........................ 60/267; 29/890.01

(56) References Cited

U.S. PATENT DOCUMENTS

| | | | | |
|---|---|---|---|---|
| 5,233,755 A | * | 8/1993 | Vandendriessche | 29/890.01 |
| 5,701,670 A | | 12/1997 | Fisher et al. | 29/890.01 |
| 5,732,883 A | | 3/1998 | Beaurain et al. | 239/127.3 |
| 2002/0084190 A1 | | 7/2002 | Ewald et al. | 205/102 |
| 2004/0244360 A1 | * | 12/2004 | McMullen | 60/257 |

FOREIGN PATENT DOCUMENTS

| DE | 2519538 A1 | 11/1976 |
|---|---|---|
| DE | 196 16 838 | 10/1996 |
| DE | 100 61 186 | 1/2002 |

* cited by examiner

Primary Examiner—Ehud Gartenberg
(74) Attorney, Agent, or Firm—Crowell & Moring LLP

(57) ABSTRACT

A combustion chamber structure for a rocket engine or the like, has a combustion chamber liner with cooling channels and at least one manifold for feeding and removing a coolant, particularly a cryogenic fuel. The at least one manifold is brazed together with the combustion chamber liner and the area of the combustion chamber liner that is not covered by the at least one manifold is coated with an electroplated structural jacket. The invention also includes a method for manufacturing the combustion chamber structure.

38 Claims, 3 Drawing Sheets

COMBUSTION CHAMBER STRUCTURE AND ITS MANUFACTURING PROCESS

BACKGROUND AND SUMMARY OF THE INVENTION

This application claims the priority of 102 37 381.7 filed in Germany on Aug. 12, 2002, the disclosure of which is expressly incorporated by reference herein.

The invention relates to a combustion chamber structure, in particular for a rocket engine, consisting of a combustion chamber liner with cooling channels and at least one manifold for feeding and removing the coolant, in particular a cryogenic fuel, as well as to a method for manufacturing such a combustion chamber structure. Apart from the special field of application for rocket engines, the combustion chamber can in principle also be applied to other areas such as aircraft construction or in principle other combustion chambers and furnaces.

In a combustion chamber of a rocket engine the combustion process is maintained through a continuous feeding of fuels in order to accelerate the combustion products to a high speed and consequently to produce the thrust. This typically generates temperatures of over 3000° C. and pressures of more than 150 bar.

The structure must withstand these boundary conditions for which on the one hand the utilized material must exhibit a high stability potential at high temperatures and the structure continues to be cooled. The latter can be accomplished through a regenerative or transpiration cooling system for which a coolant must be introduced into the structure via suitable cooling channels. In many cases the coolant is cryogenic fuel, which is also heated in this manner before combustion. Through so-called manifolds the coolant is distributed from one or a few supply lines through a plurality of cooling channels in the combustion chamber structure and is also again combined.

These types of cooled combustion chamber structures according to popular design comprise a combustion chamber liner that as an interior jacket also forms the wall of the combustion chamber. The cooling channels are machined into said jacket. For the purpose of closing the cooling channels and supporting the structure as well as increasing stability, the combustion chamber structure also contains a structural jacket, which is usually created through electroplating and onto which then the manifolds for supplying the cooling channels are welded. The structural jacket hereby seals the cooling channels by being applied onto the cooling channel fins separating the channels.

The disadvantage of such a structure is that for the purpose of welding on the manifold the structural jacket must be made of a weldable material suitable for electroplating, which must meet certain requirements with regard to ductility. However this limits the material selection significantly. In addition, material that can be welded and electroplated for the most part possesses only a very low level of stability. To overcome this disadvantage the thickness of the electroplated structural jacket must be increased. However using the required thick-film electroplating process increases the costs.

U.S. Pat. No. 5,701,670 discloses an alternative possibility to a cooled combustion structure, which bypasses the thick-film electroplating process. Here a support structure is applied onto a combustion chamber liner with cooling channels in the combustion chamber throat area, wherein said support structure in turn is supported by an outside structure to which also the inlets and outlets for the coolant fluid are attached. The support structure seals an area of the cooling channels towards the exterior. However the outside structure in turn also has direct contact to the combustion chamber liner. The transition areas from the combustion liner to the support structure and to the outside structure are brazed together by heating the entire structure.

Thus, all transitions between the cooling channel fins and the sealing components are produced through a brazing operation, with which complete leak tightness of the system cannot be guaranteed. A further disadvantage is in the plurality of components, which in turn require a plurality of transitions, further reducing leak tightness. Furthermore, the stability of the outside structure is reduced through the heat-treating process in the furnace during brazing, which leads to the fact that said structure must be designed with larger dimensions than would be required based only on the selection of the material.

The task of the present invention is to further develop a combustion chamber structure in particular for a rocket engine, to the effect that an expanded material selection for the various components is available. Moreover, the thickness of the applied structural jacket is supposed to be reduced for weight and cost reasons. Finally the number of transitions between the various components should be kept as low as possible in order to keep the risk of arising leakage low. Furthermore, a method for manufacturing a combustion chamber comprising a combustion chamber liner with cooling channels and at least one manifold for feeding and removing the coolant, in particular a cryogenic fuel, should be presented, with which an expanded material selection for the individual components is available. Additionally the necessary number of procedural steps and transitions between the individual components should be reduced, thereby saving material.

For resolving the task relating to the combustion chamber structure, a combustion chamber structure as previously described pursuant to the invention is characterized in that the manifold(s) is/are brazed together with the combustion liner and the combustion chamber liner area that is not covered by the manifold(s) is coated with an electroplated structural jacket.

In the combustion chamber structure pursuant to the invention the manifold(s) is/are brazed onto the combustion chamber liner. The manifolds serve the purpose of distributing the coolant—for the most part this is cryogenic fuel—for cooling the combustion chamber and parts of the expansion nozzle from a main feed line to the cooling channels incorporated in the combustion chamber liner and/or accommodating said coolant. Depending on how the inflow and outflow of the coolant is designed from a technical point of view, one manifold or more, in particular two, are attached—one at the combustion chamber inlet and one at the transition to the expansion nozzle. The manifold(s) however do not cover the entire cooling channel area in the combustion chamber liner. Rather an electroplated structural jacket is applied to the cooling channel area that is not covered by the manifold(s) in order to seal the cooling channels to the outside and mechanically reinforce the combustion chamber liner. In this area the combustion chamber liner and the structural jacket form an interior casing facing the combustion chamber and an exterior casing for mechanical reinforcement and for sealing of the cooling channels that are attached to the interior casing.

By brazing the manifold(s) and combustion chamber liner on the one hand a very durable surface contact is created between these two components, which is sufficiently pressure-tight toward the coolant that is to be added. On the other hand, neither the manifold(s) nor the combustion chamber liner nor the structural jacket must be welded together. By eliminating the welding requirements for the structural jacket, it has become possible for the first time to conduct a coating process with high-performance material that can be deposited through electro-plating, which allows then the coating thickness to be reduced and material to be saved. Through the higher stability of the outer jacket (structural jacket), the structure pursuant to the invention can be used particularly for high-pressure engines.

According to certain preferred embodiments of the invention, the necessary leak tightness for a large area is provided through the electroplated structural jacket and the resulting 100% connection of the jacket to the cooling channel fins. Additionally tolerances can be compensated better through the electroplated coating with the structural jacket than when brazing a supporting structure onto the cooling channel fins. Furthermore through the "cold" electroplating process no additional heat must be furnished for the overall system, which would affect the stability of the individual components such as the structural jacket.

According to certain preferred embodiments of the invention, to achieve a smooth running operation the manifold(s) and the structural jacket should not exhibit any toothing. Both components must only be attached to the combustion chamber liner in a pressure-tight manner, which is ensured by the brazing and/or the electroplated coating processes. However, the structural jacket beneficially also supports the manifold(s) in the transition area to the manifold(s). This supports and reinforces the brazed connection between the combustion chamber liner and manifold(s). Although the manifolds are already attached through the brazing process, the support of the structural jacket serves the additional attachment of the manifold(s).

In particular, this support is preferably guaranteed according to certain preferred embodiments of the invention in that the structural jacket covers an area of the manifold(s) that faces the structural jacket. This area is preferably a collar-shaped peripheral runner on the manifold(s). The advantage is that this can be implemented easily during the electroplating process without additional effort.

According to certain preferred embodiments of the invention, the materials for the combustion chamber liner comprise preferably a high-performance, good thermoconducting material, for which in particular copper or copper alloys can be considered based on the good heat-conducting coefficient. The structural jacket is preferably produced from a high-performance material, in particular from nickel or a nickel alloy to create a supporting structure. The manifold(s) consist preferably of a high-temperature material, and here in particular of a nickel-based alloy. Apart from the above-mentioned materials other materials or also combinations thereof can be used if they fulfill the set requirements.

The solution to the object pertaining to the manufacturing method pursuant to the invention is characterized in that the manifold(s) are brazed together with the combustion chamber liner and that a structural jacket is attached through electroplating to the combustion chamber liner area that is not covered by the manifold(s).

The advantage of the manufacturing method pursuant to the invention is that a simple method is available, which saves material since high-performance materials that no longer necessarily require welding can be used, which provide the necessary stability even with a low thickness. Moreover, through the method pursuant to the invention the material selection is considerably larger. Furthermore, a high degree of leak tightness is achieved from the reduced number of components by creating only few transitions, which ideally additionally are also sealed towards the coolant.

According to certain preferred embodiments if the invention, the structural jacket is applied in such a manner that it supports the manifold(s). This is accomplished in particular through the fact that the structural jacket is pulled over an area of the manifold(s) so that it supports the brazed connection through its mechanical characteristics.

The solder between the manifold(s) and the combustion chamber liner can be incorporated in various manners. Preferably, however, it is placed in the form of a brazed film between the manifold(s) and the combustion chamber liner prior to the brazing process. This guarantees even material application, and such a procedural step is also simple to handle without impairing the results.

Alternatively, according to certain preferred embodiments of the invention, the solder can also be applied to the manifold(s) before the brazing process through kinetic cold gas compacting or a chemical coating. It is also possible to coat the combustion chamber liner areas, which come into contact with the manifold(s) during assembly, with the solder according to certain preferred embodiments of the invention. An advantage with this coating is that very thin layers can be added with accuracy. Furthermore additional simplification is ensured through a decrease in components during assembly.

According to certain preferred embodiments of the invention, the soldering process occurs under a vacuum or inert gas. The soldering cycles are hereby adjusted among other things to the heat-treating cycles of the employed base metal. For the solder, materials on a precious metal-copper or silver basis as well as their alloys are used.

According to certain preferred embodiments of the invention, the structural jacket is applied in a thickness of 10 to 20 mm.

Through the method pursuant to the invention, the elimination of the weldability issue of the materials significantly increases the material selection, wherein now also high-performance non-weldable materials from alloys can be utilized. Thus the load capacity of the structural jacket is increased, and in particular the throat area of the combustion chamber is further reinforced.

According to certain preferred embodiments of the invention, the structural jacket can be accomplished preferably through an electroplated coating of several layers on top of each other, wherein different materials can also be deposited. Alternatively the structural jacket can also be applied through the so-called pulse plating process, where anodes and cathodes during the electroplating coating process are supplied with periodic electric current pulses. Through this, thicker layers are achieved in one coating method than is the case with the "normal" electroplating process with continuous currents. More detailed information regarding the pulse plating process can be found in German Patent Document DE 100 61 186 C1 (corresponding U.S. pending application 2002-08-4190).

The invention is described in more detail in the following based on an example depicted in the drawings, which results in additional details, features and preferences.

Other objects, advantages and novel features of the present invention will become apparent from the following detailed description of the invention when considered in conjunction with the accompanying drawings.

DETAILED DESCRIPTION OF THE DRAWINGS

Figure 1A:
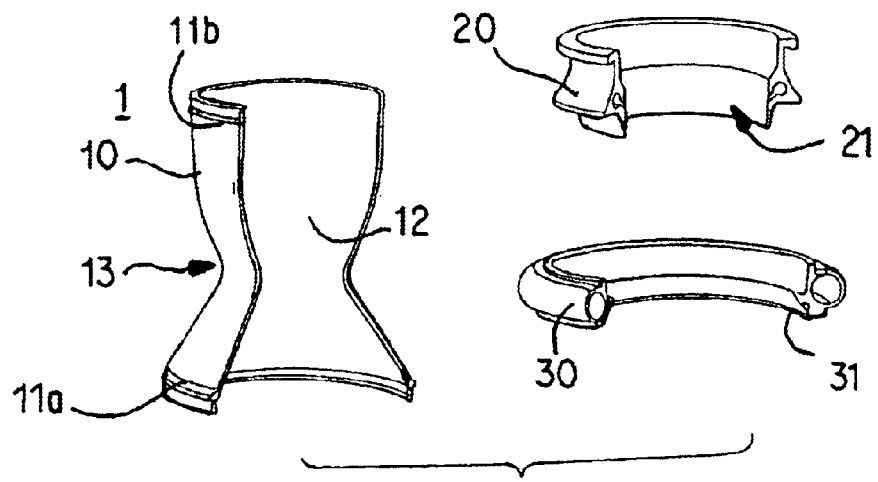
FIGS. 1a through 1d schematically depict the assembly and manufacturant steps pursuant to preferred embodiments of the invention including brazing of the manifolds with the combustion chamber liner.

FIG. 1a shows the components of a preferred embodiment, including a combustion chamber liner 10, and a first and a second manifold 20, 30, which are responsible for the supply and removal of the coolant liquid in the combustion chamber structure, before their assembly into the combustion chamber structure 1. The combustion chamber liner 10 forms the combustion chamber 12 with its interior side, and in a narrowing section it forms the combustion chamber throat 13 including a part of an expansion nozzle. For cooling purposes, cooling channels (for clarity reasons they are not shown) are machined into the exterior side along the combustion chamber 10. The coolant liquid, here cryogenic fuel, is distributed in the assembled condition via the second manifold 30 to the cooling channels, before the fuel is collected through the first manifold 20 and fed to the combustion chamber 12 through an injection head.

For brazing purposes, a solder film can be introduced between the manifolds 20, 30 and the combustion chamber liner 10. In the depicted embodiment, however, the contact surfaces 21, 31 of the manifolds on the liner side, which come into contact with the combustion chamber liner 10 in the assembled state, are coated with solder by means of the kinetic cold gas compacting method. Alternatively it would also be possible to perform a chemical coating operation of the contact surfaces 20, 31 with the solder or a coating operation of the contact surfaces 11a, 11b on the combustion chamber liner.

Figure 1B:
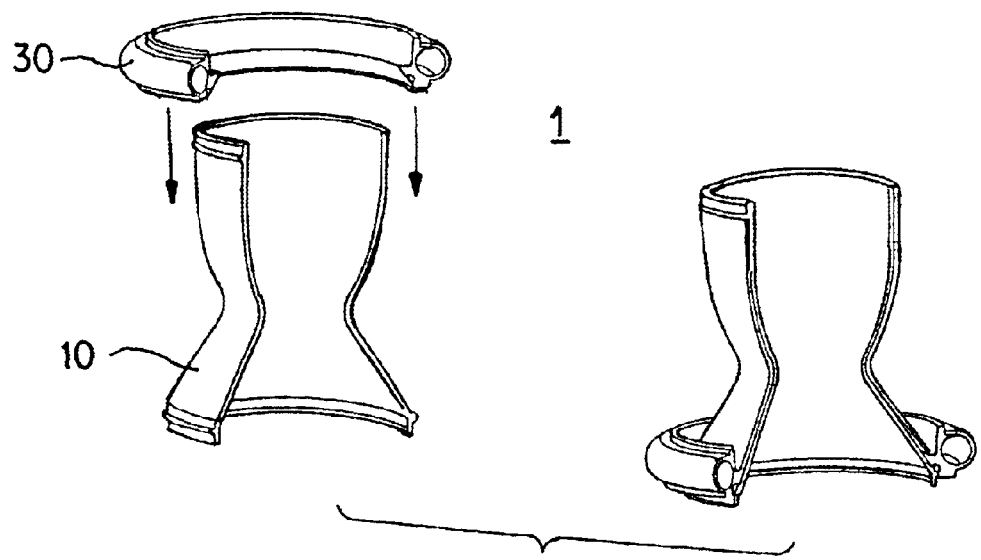
Figure 1C:
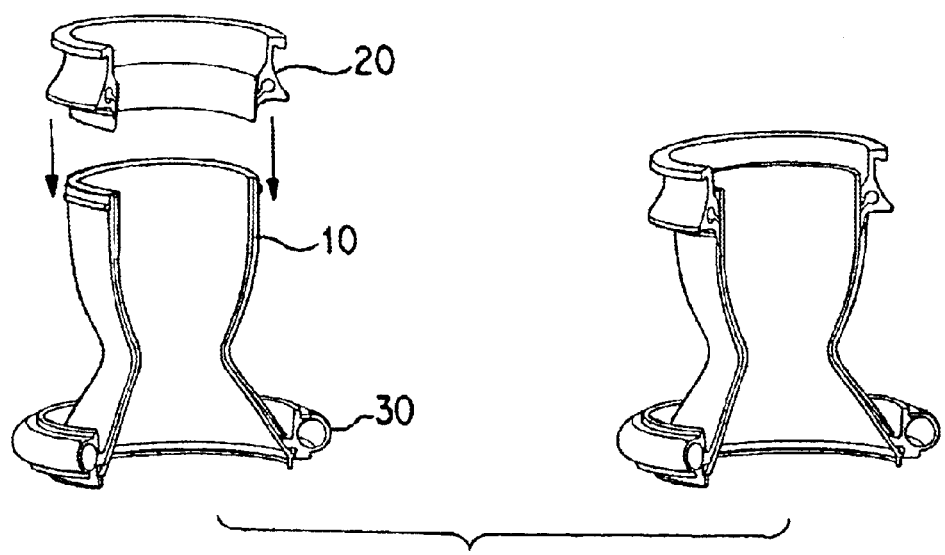

As seen in FIGS. 1b and 1c, the manifolds 20, 30 are pulled over the combustion chamber 10 to the corresponding location after being coated with the solder, as indicated with the arrow. There they are attached to prevent slipping during the further course of assembly process until the brazing operation. The brazing operation itself occurs at high temperatures and under a vacuum or inert gas to prevent oxidation of the brazed surface.

Figure 1D:
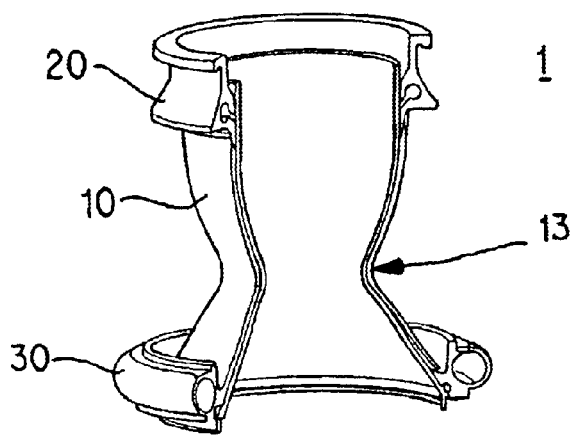

FIG. 1d shows the combustion chamber structure after the brazing of the combustion chamber liner 10 with the manifolds 20, 30. The manifolds 20, 30 cover only a portion of the exterior surface of the combustion chamber liner 10. Between the manifolds, in particular in the combustion chamber throat area 13, the cooling channel fins are not covered and the cooling channels are thus open. This area is coated through electroplating. For this purpose, the cooling channels are filled with wax so that only the cooling channel fins remain open. This ensures that the cooling channel interior walls are not coated, however that the layer forms an intimate connection with the cooling channel fins. The wax is removed thermally after coating with the structural jacket.

Figure 2:
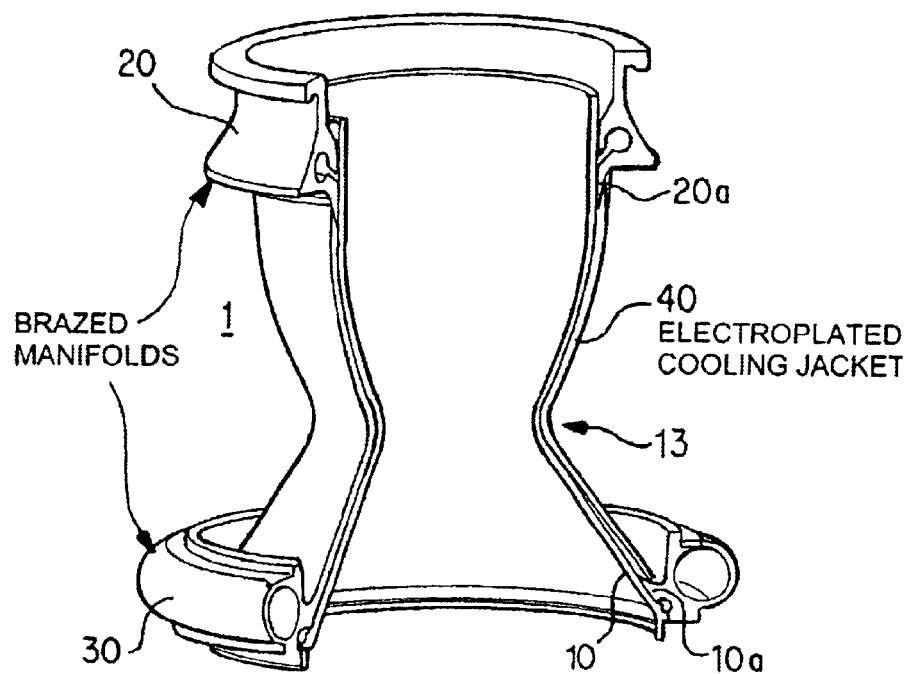
FIG. 2 schematically depicts the electroplating coating of the combustion chamber liner with the structural jacket and the simultaneous additional attachment of the manifolds according to the preferred embodiments of the invention.

FIG. 2 shows the finished coated combustion chamber structure 1, in which the electroplated structural jacket 40 closes the cooling channels through a 100% connection of the layer with the cooling channel fins and forms a thick structure so that transportation of the coolant from the second manifold 30 through the cooling channels to the first manifold 20 can occur. The structural jacket 40 for both manifolds 10, 20 reaches across collar-shaped runners 10a, 20a, which additionally attaches the manifolds 20, 30. The electroplated structural jacket 40 leads to a reinforcement in the combustion chamber throat area 13 of the combustion chamber structure 1. Through the "cold" electroplating process, the stability of the components, in particular the structural jacket, is not influenced through additional heat that is being furnished since the brazing process, which furnishes little heat, is performed before the electroplating coating with the structural jacket.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Combustion chamber structure for a rocket engine, comprising a combustion chamber liner with cooling channels and at least one manifold for feeding and removing a coolant, wherein the at least one manifold is brazed together with the combustion chamber liner, and wherein the area of the combustion chamber liner that is not covered by the at least one manifold is coated with an electroplated structural jacket.

2. Combustion chamber structure pursuant to claim 1, wherein the structural jacket additionally supports the at least one manifold.

3. Combustion chamber structure pursuant to claim 2, wherein the structural jacket covers an area of the at least one manifold.

4. Combustion chamber structure pursuant to claim 1, wherein the combustion chamber liner consists of a high-performance, good thermoconducting material, in particular copper or a copper alloy, wherein the structural jacket consists of a high-performance material, in particular nickel or a nickel alloy, and wherein the at least one manifold consists of a high-temperature material, in particular a nickel-based alloy.

5. Combustion chamber structure pursuant to claim 1, wherein said at least one manifold includes a manifold for feeding a coolant and a manifold for removing a coolant.

6. Combustion chamber structure pursuant to claim 1, wherein the at least one manifold includes respective inlet and outlet manifolds for coolant in the form of cryogenic fuel for the rocket engine.

7. Method for manufacturing a combustion chamber structure for a rocket engine, comprising a combustion chamber liner with cooling channels and at least one manifold for feeding and removing a coolant, particularly a cryogenic fuel, said method comprising:

brazing the at least one manifold together with the combustion chamber liner, and coating an area of the combustion chamber liner that is not covered by the at least one manifold with an electroplated structural jacket.

8. Method for manufacturing a combustion chamber structure pursuant to claim 7, wherein the structural jacket is applied such that the structural jacket supports the at least one manifold.

9. Method for manufacturing a combustion chamber structure pursuant to claim 7, wherein the solder is introduced between the at least one manifold and the combustion chamber liner in the form of a brazed film prior to the brazing process.

10. Method for manufacturing a combustion chamber structure pursuant to claim 8, wherein the solder is introduced between the at least one manifold and the combustion chamber liner in the form of a brazed film prior to the brazing process.

11. Method for manufacturing a combustion chamber structure pursuant to claim 7, wherein the at least one manifold includes respective inlet and outlet manifolds for coolant in the form of cryogenic fuel for the rocket engine.

12. Method for manufacturing a combustion chamber structure pursuant to claim 7, wherein the solder is applied to the at least one manifold or the combustion chamber liner prior to the brazing process through a kinetic cold gas compacting operation or through a chemical coating operation.

13. Method for manufacturing a combustion chamber structure pursuant to claim 7, wherein the structural jacket is applied at a layer thickness of 10–20 mm.

14. Method for manufacturing a combustion chamber structure pursuant to claim 8, wherein the structural jacket is applied at a layer thickness of 10–20 mm.

15. Method for manufacturing a combustion chamber structure pursuant to claim 9, wherein the structural jacket is applied at a layer thickness of 10–20 mm.

16. Method for manufacturing a combustion chamber structure pursuant to claim 12, wherein the structural jacket is applied at a layer thickness of 10–20 mm.

17. Method for manufacturing a combustion chamber structure pursuant claim 7, wherein the structural jacket is applied in several partial layers.

18. Method for manufacturing a combustion chamber structure pursuant to claim 8, wherein the structural jacket is applied in several partial layers.

19. Method for manufacturing a combustion chamber structure pursuant claim 9, wherein the structural jacket is applied in several partial layers.

20. Method for manufacturing a combustion chamber structure pursuant claim 12, wherein the structural jacket is applied in several partial layers.

21. Method for manufacturing a combustion chamber structure pursuant to claim 13, wherein the structural jacket is applied in several partial layers.

22. Method for manufacturing a combustion chamber structure pursuant claim 7, wherein the structural jacket is applied using a pulse-plating method.

23. Method for manufacturing a combustion chamber structure pursuant claim 8, wherein the structural jacket is applied using a pulse-plating method.

24. Method for manufacturing a combustion chamber structure pursuant claim 9, wherein the structural jacket is applied using a pulse-plating method.

25. Method for manufacturing a combustion chamber structure pursuant claim 13, wherein the structural jacket is applied using a pulse-plating method.

26. Method for manufacturing a combustion chamber structure pursuant claim 17, wherein the structural jacket is applied using a pulse-plating method.

27. Method for manufacturing a combustion chamber structure pursuant claim 7, wherein said at least one manifold includes an inlet manifold and an outlet manifold.

28. A combustion chamber structure comprising:
   a combustion chamber liner with cooling channels for a coolant,
   at least one manifold operable to communicate the coolant with the cooling channels, said at least one manifold being connected by brazing to a part of said combustion chamber liner, and
   a structural jacket electroplated on areas of the combustion chamber liner which are not covered by said brazing.

29. A combustion chamber structure according to claim 28, wherein the structural jacket additionally supports the at least one manifold.

30. A combustion chamber structure according to claim 29, wherein the structural jacket covers an area of the at least one manifold.

31. A combustion chamber structure according to claim 28, wherein the combustion chamber liner consists of a high-performance, good thermoconducting material, in particular copper or a copper alloy,
   wherein the structural jacket consists of a high-performance material, in particular nickel or a nickel alloy, and
   wherein the at least one manifold consists of a high-temperature material, in particular a nickel-based alloy.

32. A combustion chamber structure according to claim 28, wherein the combustion chamber structure is for a rocket engine, and
   wherein the at least one manifold includes respective inlet and outlet manifolds for coolant in the form of cryogenic fuel for the rocket engine.

33. A method of making a combustion chamber structure having a combustion chamber liner with cooling channels for a coolant, at least one manifold operable to communicate the coolant with the cooling channels, and a structural jacket covering portions of the liner and cooling channels, said method comprising:
   connecting the at least one manifold to the combustion chamber liner by brazing, and subsequently electroplating the structural jacket onto areas of the combustion chamber liner which are not covered by said brazing and at least one manifold.

34. A method according to claim 33, wherein the combustion chamber structure is for a rocket engine, and
   wherein the at least one manifold includes respective inlet and outlet manifolds for coolant in the form of cryogenic fuel for the rocket engine.

35. A method according to claim 33, wherein the structural jacket additionally supports the at least one manifold.

36. A method according to claim 35, wherein the structural jacket covers an area of the at least one manifold.

37. A method according to claim 33, wherein the combustion chamber liner consists of a high-performance, good thermoconducting material, in particular copper or a copper alloy,
   wherein the structural jacket consists of a high-performance material, in particular nickel or a nickel alloy, and
   wherein the at least one manifold consists of a high-temperature material, in particular a nickel-based alloy.

38. A method according to claim 33, wherein said structural jacket covers at least parts of the cooling channels.

* * * * *